(12) United States Patent
Nagatomo et al.

(10) Patent No.: US 8,536,024 B2
(45) Date of Patent: Sep. 17, 2013

(54) PROCESSING METHOD FOR A WORKPIECE, DIVIDING METHOD FOR A WORKPIECE, AND LASER PROCESSING APPARATUS

(75) Inventors: Shohei Nagatomo, Osaka (JP); Mitsuru Sugata, Osaka (JP); Ikuyoshi Nakatani, Osaka (JP)

(73) Assignee: Mitsuboshi Diamond Industrial Co., Ltd. (JP)

( * ) Notice: Subject to any disclaimer, the term of this patent is extended or adjusted under 35 U.S.C. 154(b) by 247 days.

(21) Appl. No.: 12/970,144

(22) Filed: Dec. 16, 2010

(65) Prior Publication Data
US 2011/0155706 A1  Jun. 30, 2011

(30) Foreign Application Priority Data
Dec. 25, 2009 (JP) .................. 2009-294278

(51) Int. Cl.
*H01L 21/301* (2006.01)
(52) U.S. Cl.
USPC .. 438/463; 438/940; 219/121.68; 219/121.77
(58) Field of Classification Search
USPC .... 438/458, 460, 462, 463, 940; 219/121.68, 219/121.69, 121.76, 121.77
See application file for complete search history.

(56) References Cited

U.S. PATENT DOCUMENTS

| | | | | |
|---|---|---|---|---|
| 6,023,039 | A * | 2/2000 | Sawada | 219/121.61 |
| 6,992,026 | B2 | 1/2006 | Fukuyo et al. | |
| 7,435,927 | B2 * | 10/2008 | Bruland et al. | 219/121.69 |
| 7,947,920 | B2 | 5/2011 | Van Borkulo et al. | |
| 8,084,333 | B2 | 12/2011 | Sakamoto | |
| 2004/0134894 | A1 | 7/2004 | Gu et al. | |
| 2005/0098548 | A1 | 5/2005 | Kobayashi et al. | |
| 2007/0111478 | A1 * | 5/2007 | Komura et al. | 438/462 |
| 2008/0035611 | A1 | 2/2008 | Kuno et al. | |

FOREIGN PATENT DOCUMENTS

| | | |
|---|---|---|
| EP | 1255280 | 11/2002 |
| EP | 1 498 216 | 1/2005 |
| EP | 2 040 286 | 3/2009 |
| JP | 2002-329686 | 11/2002 |
| JP | 2003-338468 | 11/2003 |

(Continued)

OTHER PUBLICATIONS

Extended European Search Report dated Apr. 19, 2011 for corresponding European Application No. 10196718.
Office Action issued by the Japanese Patent Office on Oct. 7, 2011 in connection with corresponding Japaness Patent Application No. 2009-294278.

(Continued)

*Primary Examiner* — Samuel M Heinrich
(74) *Attorney, Agent, or Firm* — Ostrolenk Faber LLP

(57) ABSTRACT

Provided are a processing method for forming division originating points in a workpiece and a laser processing apparatus performing the method, which are capable of reducing light absorption in a processing trail, increasing light extraction efficiency from sapphire, and performing high speed processing. A pulsed laser beam is irradiated to a workpiece so that irradiation regions for each of unit pulsed beams of the pulsed laser beam of ultra-short pulse are formed discretely in the workpiece, and cleavage or parting of the workpiece is sequentially generated between the irradiation regions by a shock or a stress when each of unit pulsed beam is irradiated at an irradiation point, to thereby form originating points for division in the workpiece.

17 Claims, 7 Drawing Sheets

(56) References Cited

FOREIGN PATENT DOCUMENTS

| JP | 2004-9139 | 1/2004 |
| JP | 2005-271563 | 10/2005 |
| JP | 2006-068816 | 3/2006 |
| JP | 2007-83309 | 4/2007 |
| JP | 2007-129225 | 5/2007 |
| JP | 2007165848 A * | 6/2007 |
| JP | 2007220909 | 8/2007 |
| JP | 2008-98465 | 4/2008 |
| JP | 2008-110405 | 5/2008 |
| JP | 2009-39732 | 2/2009 |
| JP | 2009-142825 | 7/2009 |
| JP | 2009-166103 | 7/2009 |
| JP | 2000-214182 | 9/2009 |
| JP | 2009-214182 | 9/2009 |
| WO | WO 2006/062017 | 6/2006 |

OTHER PUBLICATIONS

Office Action issued by the Japanese Patent Office on Apr. 9, 2013 in connection with corresponding Japanese Patent Application No. 2009-294278 with partial English translation.

Office Action issued by the Japanese Patent Office on Apr. 23, 2013 in connection with corresponding Japanese Patent Application No. 2009-294278 with partial English translation.

Office Action issued by the Japanese Patent Office on Apr. 30, 2013 in connection with corresponding Japanese Patent Application No. 2009-294278 with partial English translation.

Office Action issued by the Japanese Patent Office on Oct. 7, 2011 in connection with corresponding Japanese Patent Application No. 2009-294278.

Partial translation of Office Action issued by the Japanese Patent Office on Oct. 7, 2011 in connection with corresponding Japanese Patent Application No. 2009-294278.

* cited by examiner

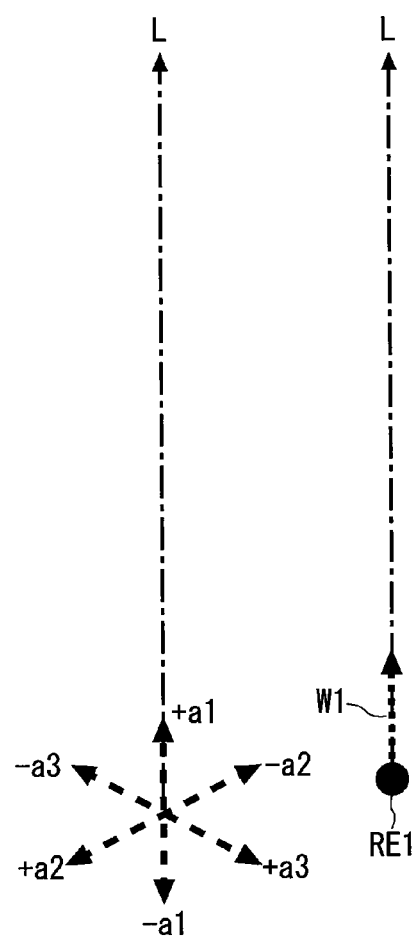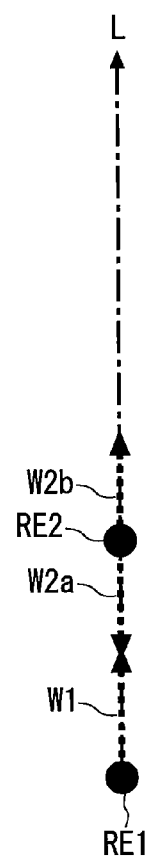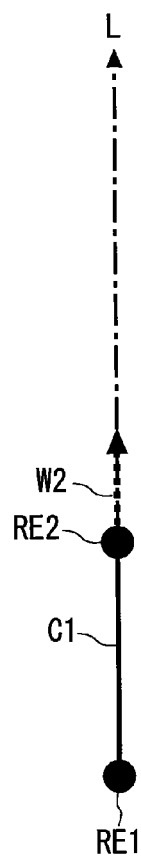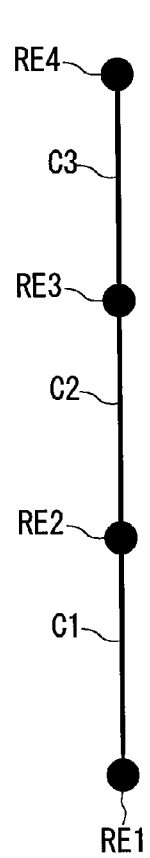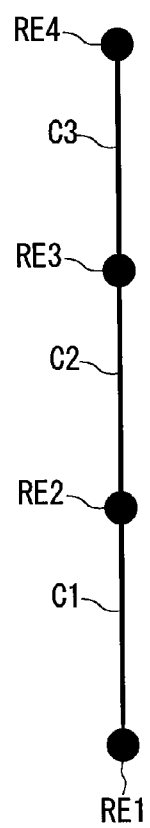

PROCESSING METHOD FOR A WORKPIECE, DIVIDING METHOD FOR A WORKPIECE, AND LASER PROCESSING APPARATUS

BACKGROUND OF THE INVENTION

1. Field of the Invention

The present invention relates to a laser processing method of processing a workpiece by irradiation of a laser beam.

2. Description of the Background Art

Various technologies of processing a workpiece by irradiation of a pulsed laser beam (hereinafter, simply referred to as laser processing or laser processing technology as well) have been publicly known (for example, see Japanese Patent Application Laid-Open No. 2004-9139, International Publication WO 2006/062017, and Japanese Patent Application Laid-Open Nos. 2007-83309 and 2008-98465).

Japanese Patent Application Laid-Open No. 2004-9139 discloses the technique of forming, in dividing a die as a workpiece, a groove (break groove) having a V-shaped cross section along a planned division line by laser ablation to divide the die with this groove being an originating point. On the other hand, International Publication WO 2006/062017 discloses the technique of generating, in an irradiation region, a melting modified region (altered region) having an approximately V-shaped cross section in which a crystal state is more deformed compared with surroundings by irradiating a laser beam in a defocused state along a planned division line of a workpiece (object to be divided), to thereby divide the workpiece with a lowermost point of the melting modified region being an originating point.

In a case where a division originating point is formed using the technology disclosed in Japanese Patent Application Laid-Open No. 2004-9139 or International Publication WO 2006/062017, it is critical to form a V-shaped cross section (groove cross section or altered region cross section) having a constant shape along a planned division line direction that is a scanning direction of a laser beam for excellent division thereafter. To this end, for example, irradiation of a laser beam is controlled such that irradiation regions (beam spots) of a laser beam for each pulse overlap each other front and back.

For example, when R represents a repetition frequency (unit: kHz) and V represents a scanning speed (unit: min/sec), which are the most basic parameters in laser processing, a ratio V/R therebetween is an interval between centers of the beam spots. In the technologies disclosed in Japanese Patent Application Laid-Open No. 2004-9139 and International Publication WO 2006/062017, irradiation and scanning of laser beams are performed on the condition that V/R is equal to or smaller than 1 μm, so that beam spots overlap each other.

Further, Japanese Patent Application Laid-Open No. 2007-83309 discloses the mode in which a laser beam is irradiated with a light focus point directed to an inside of a substrate having a lamination part on a surface to form a modified region inside the substrate, and this modified region is used as an originating point for cutting.

Further, Japanese Patent Application Laid-Open No. 2008-98465 discloses a mode in which laser beam scanning is repeated a plurality of times on one separation line, to thereby form, vertically in a depth direction, a groove and a modified part that are continuous from each other in the separation line direction and internal modified parts that are not continuous from each other in the separation line direction.

On the other hand, Japanese Patent Application Laid-Open No. 2005-271563 discloses the processing technology using a laser beam of an ultra-short pulse having a pulse width such as psec order, in which minute melting trails consisting of a group of micro cracks are formed from a front layer portion to the surface of a workpiece (plate) by adjusting a light collecting point of a pulsed laser beam, to thereby form a linear easily separable region where such melting trails are continuously lining.

The technique of forming a division originating point by a laser beam and then performing division with a braker is superior to diamond scribing which is a conventionally-performed mechanically cutting method in that it is performed more automatically at higher speed, and with higher stability and accuracy.

However, in a case where a workpiece, in which a light emitting device structure such as an LED structure is formed on a substrate made of fragile and optically transparent material such as sapphire, is divided in units of chips (divided pieces), processing trails caused as a result of laser processing absorb the light generated inside the light emitting device, leading to a problem that light extraction efficiency from the device deteriorates. In particular, such a problem is serious in a case of a light emitting device structure in which a sapphire substrate having a high refractive index is used.

As a result of intensive studies, the inventor(s) of the present invention have found that the formation of minute asperity at a processed position of a workpiece with the use of cleavage properties or parting properties of the workpiece to reduce a total reflection index at the position solves the above-mentioned problem and is effective at achieving much higher light extraction efficiency compared with diamond scribing in which laser processing trails are not present, and that the asperity is preferably formed with the use of a laser beam of ultra-short pulse.

In Japanese Patent Application Laid-Open No. 2004-9139, International Publication WO 2006/062017, Japanese Patent Application Laid-Open Nos. 2007-83309, 2008-98465 and 2005-271563, such a problem is not mentioned and a mode in which cleavage properties or parting properties of a workpiece are used is not disclosed nor suggested.

SUMMARY OF THE INVENTION

The present invention relates to a laser processing method of processing a workpiece by irradiation of a laser beam and a laser processing apparatus that performs this method, and particularly, is directed to processing of forming originating points for division in a workpiece.

According to the present invention, a processing method for forming division originating points in a workpiece includes the steps of: a) preparing a workpiece; and b) irradiating the workpiece with a pulsed laser beam to discretely form irradiation regions for each of unit pulsed beams of the pulsed laser beam in the workpiece, wherein in the step b), originating points for division are formed in the workpiece by sequentially generating cleavage or parting of the workpiece between the irradiation regions.

Further, according to the present invention, a laser processing apparatus includes: a light source emitting a pulsed laser beam; a stage on which a workpiece is placed; and an irradiation element irradiating the workpiece with the pulsed laser beam while moving the stage so that irradiation regions for each of unit pulsed beams of the pulsed laser beam are formed discretely in the workpiece placed on the stage, wherein the irradiation element forms originating points for division in the workpiece by sequentially generating cleavage or parting of the workpiece between the irradiation regions.

According to the present invention, cleavage or parting is aggressively generated in the workpiece while the workpiece is locally altered or splattered, whereby division originating points can be formed in an object to be divided at a much higher speed compared with a conventional case.

An object of the present invention is therefore to provide a processing method for forming division originating points in a workpiece and a laser processing apparatus performing the method, which are capable of reducing light absorption in a processing trail, increasing light extraction efficiency from sapphire, and performing high speed processing.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 are diagrams for describing processing by a first processing pattern;

Figure 2:
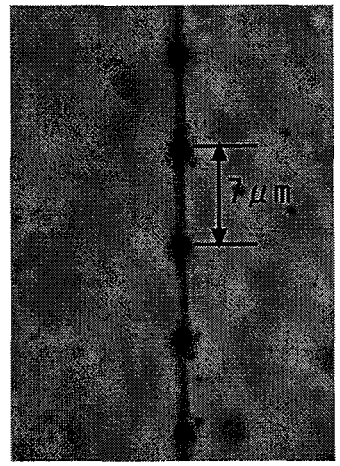
FIG. 2 shows an optical microscope image of a surface of a workpiece in which division originating points are formed by cleavage/parting processing by the first processing pattern.

DESCRIPTION OF THE PREFERRED EMBODIMENT (Processing Principle)

First, description is given of the principle of processing that is realized in a preferred embodiment of the present invention below. In the processing performed in the present invention, broadly speaking, a pulsed laser beam (hereinafter, also merely referred to as a laser beam) is irradiated to an upper surface of the workpiece while performing scanning therewith, to thereby generate cleavage or parting of a workpiece between irradiation regions for each pulse sequentially, and consequently, originating points for division (division originating points) are formed as continuous planes of the cleavage planes or parting planes.

Note that in this preferred embodiment, parting refers to a phenomenon in which a workpiece breaks in a substantially regular manner along a crystal plane other than a cleavage plane, and the crystal plane is referred to as a parting plane. In addition to cleavage and parting that are microscopic phenomena completely along a crystal plane, there is a case where a crack that is macroscopic breaking occurs along an almost same crystal orientation. In some materials, only one of cleavage, parting and crack mainly occurs, but, thereafter, cleavage, parting and crack are not distinguished and are collectively referred to as, for example, cleavage/parting for the sake of brevity. Further, processing in the above-mentioned mode is merely referred to as cleavage/parting processing in some cases.

Description is given below by taking, as an example, a case where a workpiece is a single crystal material of hexagonal crystal, and axial directions of an a1 axis, an a2 axis and an a3 axis thereof are easily-cleaved/parted-directions. For example, a c-plane sapphire substrate corresponds to this. The a1 axis, a2 axis and a3 axis of hexagonal crystal form angles of 120° therebetween in the c-plane and are positioned symmetrically each other. In the processing of the present invention, there are several patterns in accordance with the relationship between the directions of those axes and a direction of a planned processing line (planned processing direction), which are described below. Note that a laser beam irradiated for each pulse is referred to as a unit pulsed beam.

(First Processing Pattern)

A first processing pattern is the mode of cleavage/parting processing in a case where any one of the a1 axis direction, a2 axis direction and a3 axis direction is parallel to the planned processing line. More generally speaking, this is the processing mode in which the easily-cleaved/parted-direction coincides with the planned processing line.

FIG. 1 schematically show the processing mode by the first processing pattern. FIG. 1 illustrate a case where the a1 axis direction is parallel to a planned processing line L. FIG. 1A shows the orientation relationship between the a1 axis direction, a2 axis direction and a3 direction, and the planned processing line L in this case. FIG. 1B shows the state in which a first unit pulsed beam of a laser beam is irradiated to an irradiation region RE1 at the end of the planned processing line L.

Typically, irradiation of a unit pulsed beam provides an extremely minute region of a workpiece with high energy, and thus such irradiation causes alteration, melting, evaporative removal or the like of the material on the irradiated plane in a range equal to or larger than the irradiation region of the unit pulsed beam (of a laser beam).

However, by setting irradiation time of a unit pulsed beam, that is, a pulse width to be extremely small, the material present in a substantially center region of the irradiation region RE1, which is smaller than a spot size of a laser beam, is scattered in a direction perpendicular to the irradiation plane or altered due to the kinetic energy obtained from the irradiated laser beam. On the other hand, a shock or stress generated by irradiation of a unit pulsed beam, such as the reaction force generated along with such scattering, acts on the periphery of the irradiation region, in particular, on the a1 axis direction, a2 axis direction and a3 axis direction that are the easily-cleaved/parted-directions. As a result, along those directions, minute cleavage or parting may partially occur while keeping a contact state on appearance, or thermal distortions may be contained, though not reaching cleavage or parting. In other words, it is conceivable that irradiation of a unit pulsed beam of ultra-short pulse may act as the driving force for forming a low strength portion that is approximately linear in top view, toward the easily-cleaved/parted-direction.

In FIG. 1B, of the low strength portion formed in the easily-cleaved/parted-direction, a low strength portion W1 in a +a1 direction that coincides with the extending direction of the planned processing line L is schematically indicated by a dashed arrow.

Then, as shown in FIG. 1C, a second unit pulsed beam of the laser beam is irradiated, and an irradiation region RE2 is formed at a position apart from the irradiation region RE1 by a predetermined distance on the planned processing line L, whereby a low strength portion is formed along the easily-cleaved/parted-direction in the second pulse as in the case of the first pulse. For example, a low strength portion W2a is formed in a −a1 direction, while a low strength portion W2b is formed in the +a1 direction.

Note that at this point, the low strength portion W1 formed by irradiation of the first unit pulsed beam is present in an extending direction of the low strength portion W2a. That is, the extending direction of the low strength portion W2a is the direction in which cleavage or parting may occur with a smaller amount of energy compared with other direction. For this reason, in actuality, when the second unit pulsed beam is irradiated, a shock or stress generated resultantly at that time is propagated in the easily-cleaved/parted-direction and the low strength portion present ahead of that, and cleavage or parting completely occurs from the low strength portion W2a to the low strength portion W1 almost simultaneously with the irradiation. As a result, a cleavage/parting plane C1 shown in FIG. 1D is formed. Note that the cleavage/parting plane C1 may be formed up to a depth of approximately several μm to several tens of μm in the direction perpendicular to the workpiece in view. Moreover, in the cleavage/parting plane C1, slippage is caused in a crystal plane as a result of the strong shock or stress, which causes undulations in the depth direction as described below.

After that, as shown in FIG. 1E, a unit pulsed beam is sequentially irradiated to the irradiation regions RE1, RE2, RE3, RE4, . . . by scanning with a laser beam along the planned processing line L, with the result that cleavage/parting planes C2, C3, . . . are sequentially formed in a corresponding manner. Continuous formation of cleavage/parting planes in the above-mentioned manner is the cleavage/parting processing by the first processing pattern.

That is, in the first processing pattern, a plurality of irradiation regions discretely present along the planned processing line L and the cleavage/parting planes formed between the plurality of irradiation regions become division originating points when the workpiece is divided along the planned processing line L, as a whole. After the above-mentioned formation of division originating points, the workpiece can be divided in a manner approximately along the planned processing line L by performing division with a predetermined jig or device.

Note that for performing the above-mentioned cleavage/parting processing, it is required to irradiate a laser beam of ultra-short pulse with a small pulse width. Specifically, it is necessary to use a laser beam with a pulse width of 100 psec or smaller. For example, a laser beam with a pulse width of approximately 1 psec to 50 psec is preferably used.

On the other hand, it is preferred that the irradiation pitch (distance between the centers of irradiation spots) of the unit pulsed beam be approximately 4 μm to 15 μm at most. An irradiation pitch lager than this leads to the case where the low strength portion in the easily-cleaved/parted-direction is not formed to an extent that the cleavage/parting plane can be formed, which is not desirable from the viewpoint of reliably forming division originating points formed of the above-mentioned cleavage/parting planes.

Here, when R (kHz) represents a repetition frequency of a laser beam, unit pulsed beams are emitted from the laser beam source per 1/R (msec). In a case where a laser beam moves relative to the workpiece at a speed V (mm/sec), an irradiation pitch Δ (μm) is determined by Δ=V/R. Accordingly, the scanning speed V and the repetition frequency of the laser beam are determined such that Δ becomes approximately several μm. For example, it is preferable that the scanning speed V be approximately 50 mm/sec to 3,000 mm/sec and the repetition frequency R be approximately 10 kHz to 200 kHz. Specific values of V and R may be appropriately determined in consideration of, for example, a material, absorptivity, thermal conductivity and melting point of a workpiece.

The laser beam is preferably irradiated with a beam diameter of approximately 1 μm to 10 μm. In such a case, a peak power density in irradiation of a laser beam is appropriately 0.1 TW/cm$^2$ to several tens of TW/cm$^2$.

Further, the irradiation energy (pulse energy) of a laser beam may be approximately determined within a range of 0.1 μJ to 50 μJ.

FIG. 2 shows an optical microscope image of the surface of the workpiece on which division originating points are formed by cleavage/parting processing by the first processing pattern. Specifically, FIG. 2 shows the results when a c-plane sapphire substrate is used as the workpiece, processing is performed such that the irradiation spots are discretely formed at intervals of 7 μm with the a1 axis direction being the extending direction of the planned processing line L on the c-plane thereof. The results shown in FIG. 2 suggest that the actual workpiece is processed by the mechanism described above.

Figure 3:
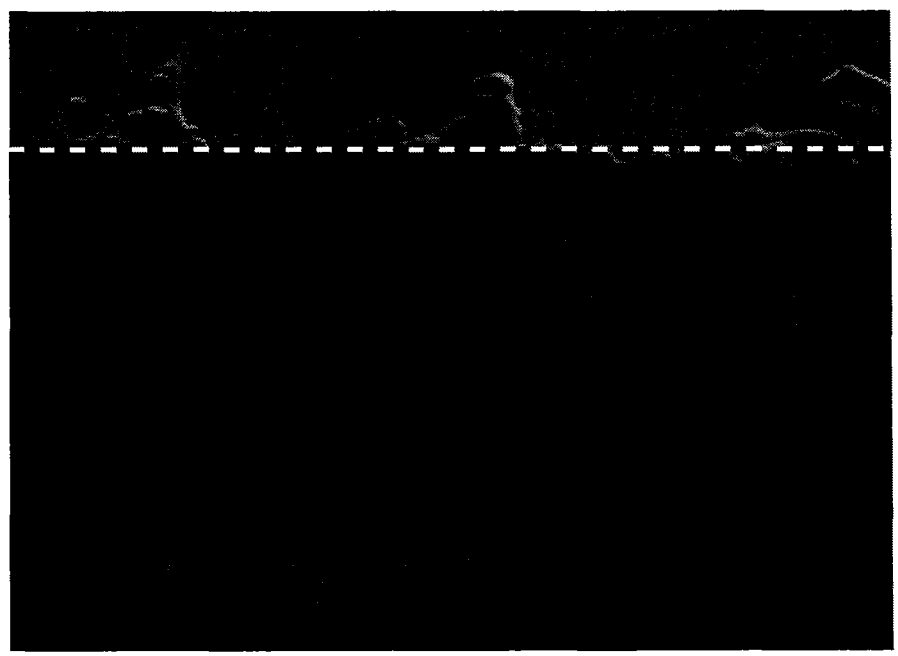
FIG. 3 shows an SEM image of a c-plane sapphire substrate in which division originating points are formed by the processing by the first processing pattern is divided along the division originating points, which ranges from a surface (c-plane) to a cross section.

FIG. 3 shows a scanning electron microscope (SEM) image of the c-plane sapphire substrate in which the division originating points are formed by the processing by the first processing pattern after being divided along the division originating points, which ranges from the surface (c-plane) to the cross section. FIG. 3 shows a boundary portion between the surface and the cross section by a dashed line.

Elongated triangular or acicular regions observed in FIG. 3, which have a longitudinal direction from the surface to the inside of the workpiece and are present at approximately equal intervals within the range of around 10 μm from the surface, are regions in which the phenomenon such as alteration or elimination by scattering has occurred directly (hereinafter, referred to as directly altered region) by the irradiation of a unit pulsed beam. The region which is present between those directly altered regions and is observed that a large number of stripe-shaped portions having a longitudinal direction in a horizontal direction in view are located in series at a submicron pitch in a vertical direction in view, is the cleavage/parting plane. The portion below those directly altered region and cleavage/parting plane is the division plane formed by division.

Note that the portions observed as the stripe-shaped portions in the SEM image are, in actuality, minute irregularities having a difference in height of approximately 0.1 μm to 1 μm formed on the cleavage/parting planes. Such irregularities are formed as a result of slippage of a specific crystal plane that is caused by a large shock or stress applied on the workpiece by irradiation of a unit pulsed beam when cleavage/parting processing is performed on a fragile inorganic compound such as sapphire.

Although such minute irregularities are present, it is judged from FIG. 3 that a surface and a cross section are substantially orthogonal to each other with a dashed portion being a boundary. Accordingly, it is conceivable that the workpiece can be divided approximately perpendicularly to the surface thereof by forming the division originating points by the first processing pattern and dividing the workpiece along the division originating points, as far as minute irregularities are acceptable as a processing error.

Note that it is desirable that such minute irregularities be aggressively formed in some cases as described below. For example, in some cases, the effect of improving light extraction efficiency that is remarkably obtained by the processing of a second processing pattern described below is achieved to some extent by the processing of the first processing pattern.

(Second Processing Pattern)

The second processing pattern is the mode of cleavage/parting processing in a case where any of the a1 axis direction, a2 axis direction and a3 axis direction is perpendicular to the planned processing line. Note that the conditions for the laser beam used in the second processing pattern is similar to that of the first processing pattern. More generally speaking, the second processing pattern is the processing mode in a case where the direction equivalent to two different easily-cleaved/parted-directions (direction serving as an axis of symmetry between two easily-cleaved/parted-directions) is the direction of the planned processing line.

FIG. 4 schematically show the processing mode by the second processing pattern. FIG. 4 illustrate the case where the a1 axis direction is orthogonal to the planned processing line L. FIG. 4A shows the orientation relationship between the a1 axis direction, a2 axis direction and a3 axis direction, and the planned processing line L. FIG. 4B shows the state in which the first unit pulsed beam of the laser beam is irradiated to an irradiation region RE11 at the end of the planned processing line L.

Figure 4A:
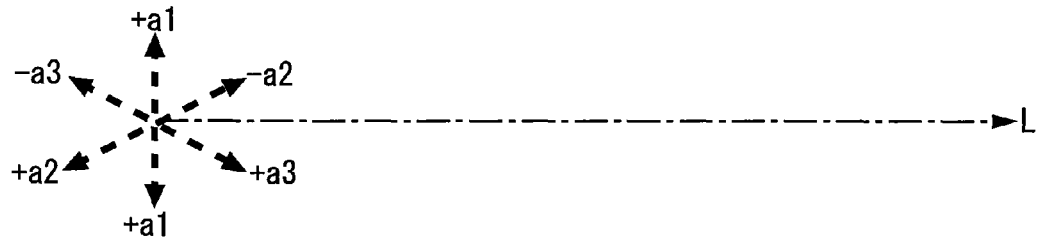
FIG. 4 schematically show a processing mode by a second processing pattern.
Figure 4B:
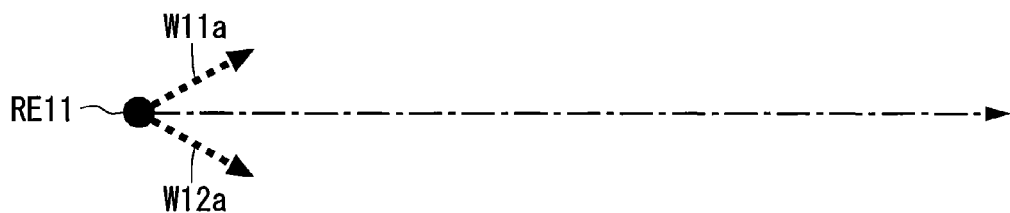

Also in the case of the second processing pattern, the low strength portion is formed by irradiating a unit pulsed beam of ultra-short pulse as in the first processing pattern. FIG. 4B schematically shows, by dashed arrows, low strength portions W11$a$ and W12$a$ in a −a2 direction and a +a3 direction close to the extending direction of the planned processing line L among the low strength portions formed in the respective easily-cleaved/parted-directions.

Figure 4C:
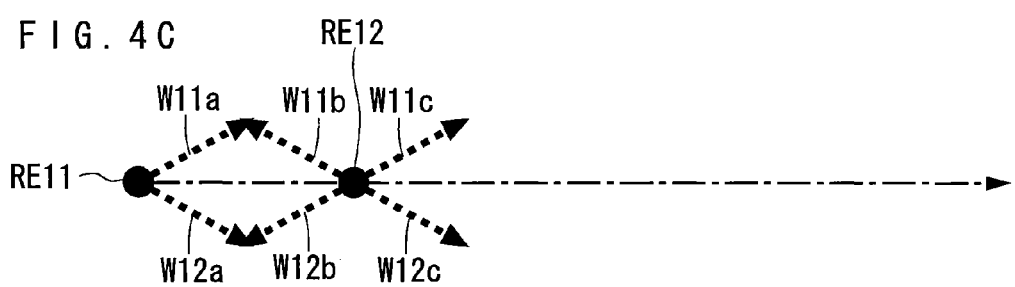

Then, as shown in FIG. 4C, a second unit pulsed beam of the laser beam is irradiated and an irradiation region RE12 is formed at the position far from the irradiation region RE11 by a predetermined distance on the planned processing line L, whereby a low strength portion along the easily-cleaved/parted-direction is formed also in the second pulse. For example, a low strength portion W11$b$ is formed in a −a3 direction, a low strength portion W12$b$ is formed in a +a2 direction, a low strength portion W11$c$ is formed in the +a3 direction, and a low strength portion W12$c$ is formed in the −a2 direction.

Figure 4D:
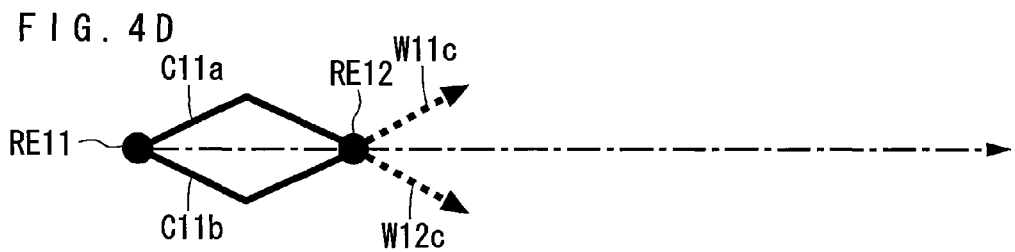

In such a case, as in the case of the first processing pattern, the low strength portions W11$a$ and W12$a$ formed by irradiation of the first unit pulsed beam are present in the extending direction of the low strength portions W11$b$ and W12$b$, respectively. Accordingly in actuality, when the second unit pulsed beam is irradiated, the shock or stress generated on that occasion are propagated to the easily-cleaved/parted-directions and the low strength portions present ahead thereof. That is, cleavage/parting planes C11$a$ and C11$b$ are formed as shown in FIG. 4D. Note that also in such a case, the cleavage/parting planes C11$a$ and C11$b$ can be formed up to a depth of approximately several μm to several tens of μm in the direction perpendicular to the workpiece in view.

Figure 4E:
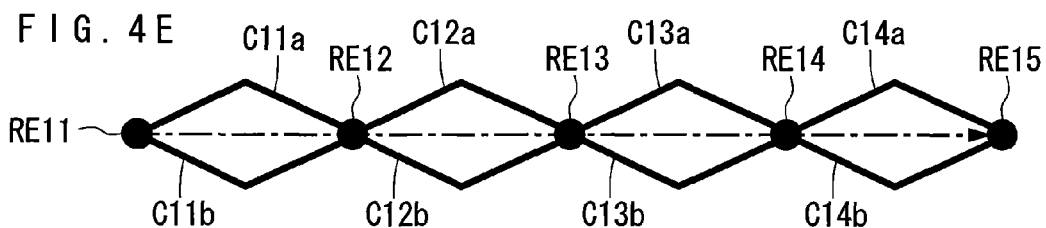

Subsequently, scanning is performed with a laser beam along the planned processing line L as shown in FIG. 4E, and a unit pulsed beam is sequentially irradiated to the irradiation regions RE11, RE12, RE13, RE14, . . . , whereby the cleavage/parting planes C11$a$ and C11$b$, C12$a$ and C12$b$, C13$a$ and C13$b$, C14$a$ and C14$b$, . . . which have a linear shape in view are sequentially formed along the planned processing line L by the shock or stress generated in the irradiation.

As a result, there is achieved a state in which the cleavage/parting planes are positioned symmetrically with respect to the planned processing line L. In the second processing pattern, a plurality of irradiation regions discretely present along the planned processing line L and the cleavage/parting planes present in a staggered manner serve as the division originating points when the workpiece is divided along the planned processing line L, as a whole.

Figure 5:
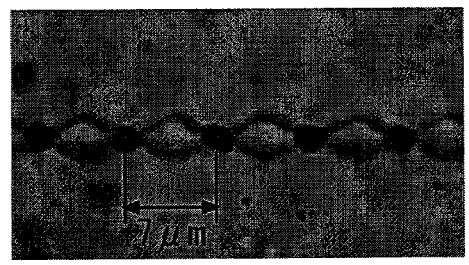
FIG. 5 shows an optical microscope image of a surface of a workpiece in which division originating points are formed by cleavage/parting processing by the second processing pattern.

FIG. 5 shows an optical microscope image of the surface of the workpiece after the division originating points are formed by the cleavage/parting processing by the second processing pattern. Specifically, FIG. 5 shows the results when the c-plane sapphire substrate is used as the workpiece, processing is performed such that the irradiation spots are discretely formed at intervals of 7 μm with the direction orthogonal to the a1 axis direction being the extending direction of the planned processing line L on the c-plane thereof. The cleavage/parting planes are also found in the actual workpiece of FIG. 5, which have a staggered shape (zigzag shape) in front view similarly to those schematically shown FIG. 4E. The above-mentioned results suggest that the actual workpiece has been processed in the above-mentioned mechanism.

Figure 6:
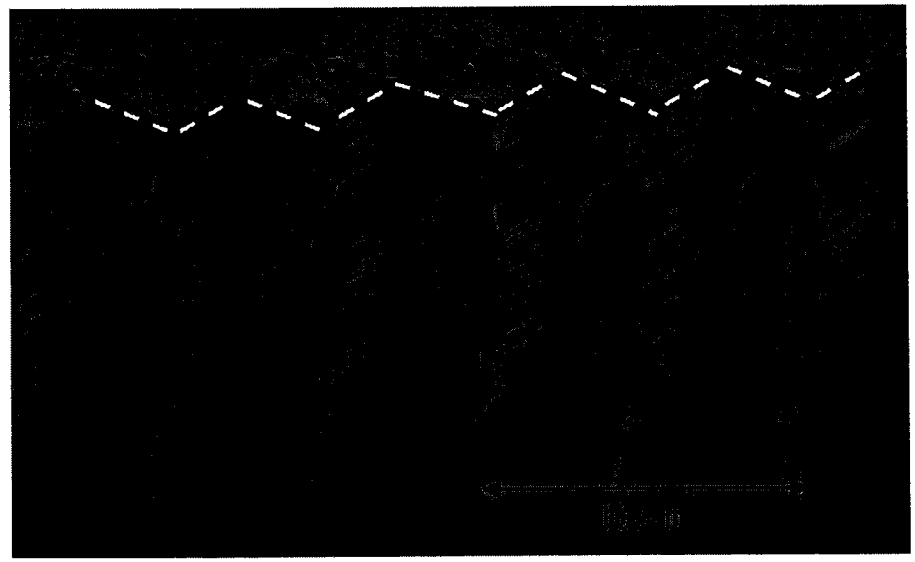
FIG. 6 shows an SEM image of a c-plane sapphire substrate in which division originating points are formed by the processing by the second processing pattern is divided along the division originating points, which ranges from a surface (c-plane) to a cross section.

FIG. 6 shows an SEM image of the c-plane sapphire substrate in which the division originating points are formed by the processing by the second processing pattern after being divided along the division originating points, which ranges from the surface (c-plane) to the cross section. Note that FIG. 6 shows a boundary portion between the surface and the cross section by a dashed line.

It is found from FIG. 6 that the cross section of the workpiece has irregularities corresponding to a staggered arrangement schematically shown in FIG. 4E within the range of around 10 μm from the surface of the workpiece in cross section after being divided. It is the cleavage/parting planes that form those irregularities. The pitch between irregularities is approximately 5 μm in FIG. 6. Similarly to the case of the processing by the first processing pattern, the cleavage/parting planes are not flat but have irregularities at a submicron pitch that have occurred as a result of slippage generated in a specific crystal plane resulting from the irradiation of a unit pulsed beam.

It is the cross section of the directly altered region that is extending in the depth direction from the surface portion correspondingly to the positions of projections of the irregularities. The shape thereof is less constant compared with the directly altered region formed by the processing of the first processing pattern shown in FIG. 3. The portion below those directly altered region and cleavage/parting planes is a divided plane formed by division.

In the case of the processing by the second processing pattern, in addition to the irregularities at a submicron pitch formed on the cleavage/parting planes, adjacent cleavage/parting planes themselves provide irregularities at a pitch of approximately several μm. The mode in which the cross section having the above-mentioned irregular shape is effective when a workpiece, in which a light emitting device structure such as an LED structure is formed on a substrate made of fragile and optically-transparent material such as sapphire, is divided in units of chips (divided pieces). In the case of a light emitting device, if the light generated inside the light emitting device is absorbed at the positions of processing trails formed in the substrate by laser processing, light extraction efficiency from the device deteriorates. However, in the case where the irregularities as shown in FIG. 6 are intentionally formed in the processing cross section of the substrate by performing the processing by the second processing pattern, the total reflectivity at those positions decreases, and higher light extraction efficiency is achieved in the light emitting device.

(Third Processing Pattern)

The third processing pattern is similar to the second processing pattern in that a laser beam of ultra-short pulse is used and that any of the a1 axis direction, a2 axis direction and a3 axis direction is perpendicular to the planned processing line (the direction equivalent to two different easily-cleaved/parted-directions is the direction of the planned processing line), but is different from the second processing pattern in the irradiation mode of a laser beam.

Figure 7A:
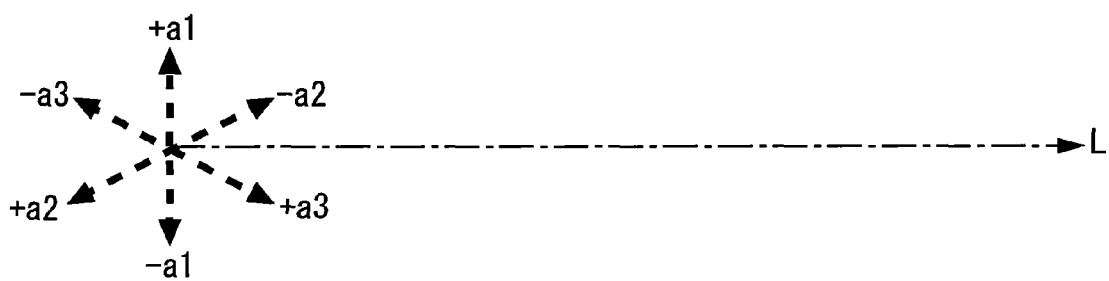
FIG. 7 schematically show a processing mode by a third processing pattern.

FIG. 7 schematically show the processing mode by the third processing pattern. FIG. 7 illustrate the case where the a1 axis direction is orthogonal to the planned processing line L. FIG. 7A shows the orientation relationship between the a1 axis direction, a2 axis direction and a3 axis direction, and the planned processing line L in this case.

Figure 7B:
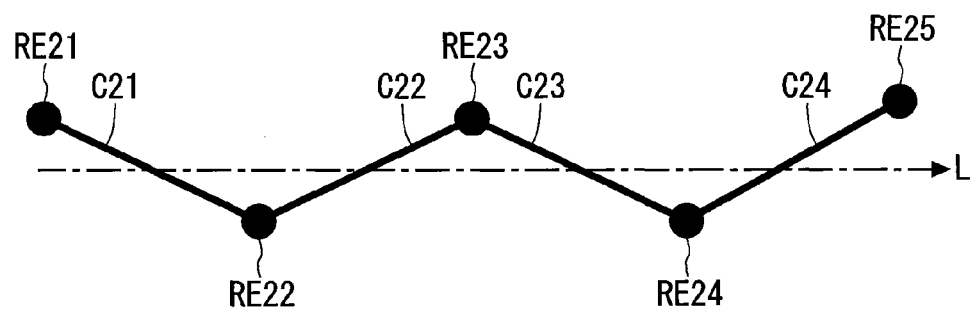

In the second processing pattern described above, scanning is linearly performed with a laser beam along the direction exactly between the a2 axis direction and the a3 axis direction (direction equivalent to the a2 axis direction and the a3 axis direction), which is the extending direction of the planned processing line L. In the third processing pattern, on the other hand, a unit pulsed beam for forming respective irradiation regions is irradiated so that respective irradiation regions are formed in a staggered layout (in a zigzag layout) in such a manner that they are alternately formed along two easily-cleaved/parted-directions that sandwich the planned processing line L therebetween as shown in FIG. 7B. In the case of FIG. 7, irradiation regions RE21, RE22, RE23, RE24, RE25, . . . are alternately formed along the −a2 direction and the +a3 direction.

Also in the case where unit pulsed beams are irradiated in the above-mentioned mode, the cleavage/parting planes are formed between the irradiation regions along with the irradiation of the respective unit pulsed beams, similarly to the first and second processing patterns. In the case of FIG. 7B, the irradiation regions RE21, RE22, RE23, RE24, RE25, . . . are formed in this order, with the result that cleavage/parting planes C21, C22, C23, C24, . . . are sequentially formed.

As a result, in the third processing pattern, a plurality of irradiation regions discretely present in a staggered manner with the planned processing line L being an axis and cleavage/parting planes formed between the irradiation regions become the division originating points when the workpiece is divided along the planned processing line L, as a whole.

Then, in a case where division is performed along the division originating points in actuality, irregularities at a pitch of several μm are formed by the cleavage/parting planes within the range around 10 μm from the surface of the workpiece after division in cross section, similarly to the second processing pattern. Moreover, irregularities at a submicron pitch resulting from slippage generated in a specific crystal plane due to the irradiation of the unit pulsed beams are generated in the respective cleavage/parting planes, similarly to the first and second processing patterns.

Accordingly, also in the processing by the third processing pattern as described above, in addition to the irregularities at a submicron pitch formed in the cleavage/parting planes, the cleavage/parting planes themselves provide irregularities at a pitch of approximately several μm, similarly to the processing by the second processing pattern. Therefore, also in a case where the processing by the third processing pattern is performed on a light emitting device, the obtained light emitting device is more preferable in terms of improvement of the above-mentioned light extraction efficiency.

In order to generate cleavage/parting with more reliability, irradiation regions may be formed at a middle point between the irradiation region RE21 and the irradiation region RE22, a middle point between the irradiation region RE22 and the irradiation region RE23, a middle point between the irradiation region RE23 and the irradiation region RE24, and a middle point between the irradiation region RE24 and the irradiation region RE25 that are positioned on the planned processing line L, depending on types of workpieces.

Incidentally, the positions of the irradiation regions in the third processing pattern are arranged along the easily-cleaved/parted-direction in part. The same holds true for the case where irradiation regions are formed also at positions of the middle points on the planned processing line L as described above. That is, the third processing pattern is made to be common to the first processing pattern in that at least two irradiation regions are formed so as to be adjacent to each other in the easily-cleaved/patted-direction of the workpiece. Therefore, from a different perspective, it is viewed that the processing in the third processing pattern is the processing by the first processing pattern with a direction of scanning with a laser beam periodically changed.

In the cases of the first and second processing patterns, the irradiation regions are positioned on the same straight line, and thus it suffices that an emitting source of the laser beam is moved on the same straight line along the planned processing line so that the irradiation region is formed every time the laser beam reaches a predetermined formation target position, which are the most efficient formation modes. In the third processing pattern, however, the irradiation regions are formed not on the same straight line but in a staggered manner (in a zigzag manner), and thus the irradiation regions can be formed not only by the technique in which an emitting source of a laser beam is moved in a staggered manner (in a zigzag manner) in actuality but also by various techniques. Note that in this preferred embodiment, moving of an emitting source refers to the relative movement between the workpiece and the emitting source, which includes the mode in which the emitting source is fixed and the workpiece is moved (in actuality, a stage on which a workpiece is placed is moved) in addition to the case where the emitting source is moved while the workpiece is fixed.

For example, it is also possible to form irradiation regions in a mode in which the above-mentioned staggered arrangement relationship is satisfied by periodically changing an emitting direction of a laser beam in a plane perpendicular to the planned processing line while moving the emitting source and the stage in a relative manner in parallel to the planned processing line at a constant speed.

Alternatively, it is possible to form irradiation regions in a mode in which the above-mentioned staggered arrangement relationship is satisfied by periodically changing the irradiation timing of the unit pulsed beams of a plurality of emitting sources while changing the respective emitting sources relative to and in parallel to each other at a constant speed.

Figure 8:
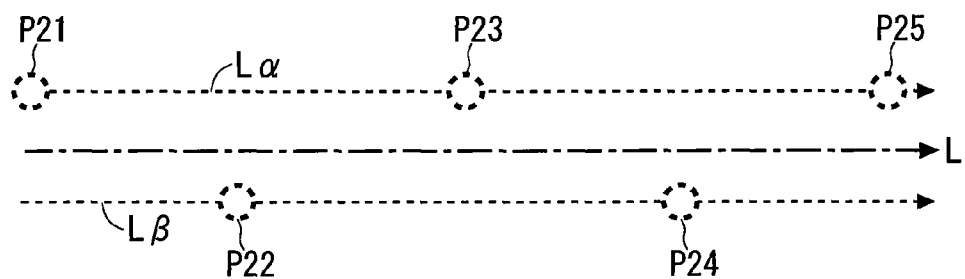
FIG. 8 shows a relationship between a planned processing line and predetermined formation positions of irradiation regions.

FIG. 8 shows the relationship between the planned processing line and the planned formation positions of irradiation regions in these two cases. In both cases, as shown in FIG. 8, it is regarded as if planned formation positions P21, P22, P23, P24, P25, . . . of the irradiation regions RE21, RE22, RE23, RE24, RE25, . . . are alternately set on straight lines Lα and Lβ that are parallel to the planned processing line L, and then the formation of the irradiation regions at the planned formation positions P21, P23, P25, . . . along the straight line Lα and the formation of the irradiation regions at the planned formation positions p22, P24, ... along the straight line Lβ are performed simultaneously in parallel to each other.

In a case where the emitting source is moved in a staggered manner (in a zigzag manner), the emitting source or the stage is moved by biaxial simultaneous operation whether the emitting source of the laser beam is directly moved or a stage on which a workpiece is placed is moved to perform scanning relatively with a laser beam. In contrast to this, the operation in which only the emitting source or the stage is moved in parallel to the planned processing line is a uniaxial operation. Therefore, the latter is more suitable for achieving high speed movement of the emitting source, that is, improvement of processing efficiency.

As described in the respective processing patterns above, cleavage/parting processing performed in this preferred embodiment is the processing mode in which discrete irradiation of a unit pulsed beam is mainly used as the means for providing the shock or stress for successively generating cleavage/parting in a workpiece. Alteration or scattering of the workpiece in the irradiation regions is merely caused just concomitantly and locally. The cleavage/parting processing according to this preferred embodiment that has the above-mentioned feature is essentially different in mechanism from a conventional processing technique of performing processing in which alteration, melting, or evaporative elimination are performed continuously or intermittently while causing irradiation regions of unit pulsed beams to overlap each other.

Then, it suffices that large shock or stress is momentarily applied on the respective irradiation regions, whereby it is possible to irradiate a laser beam with scanning with it performed at high speed. Specifically, it is possible to perform extremely high speed scanning, that is, high speed processing at 1,000 min/sec at the maximum. Given that the processing speed of a conventional processing method is approximately 200 mm/sec at most, there is a conspicuous difference between the processing method according to this preferred embodiment and the conventional processing method. Needless to say, the processing method achieved in this preferred embodiment is considered to improve the productivity to a greater extent compared with the conventional processing method.

Note that while the cleavage/parting processing according to this preferred embodiment is particularly effective in a case where a crystal orientation (orientation in the easily-cleaved/parted-direction) of a workpiece and the planned processing line have a predetermined relationship as in the respective processing patterns described above, its application target is not limited thereto. In principle, the cleavage/parting processing according to this preferred embodiment is also applicable to a case where they have an arbitrary relationship and a case where a workpiece is a polycrystalline body. In these cases, the direction in which cleavage/parting is generated with respect to the planned processing line is not necessarily constant, and accordingly irregularities may occur unevenly at division originating points. However, it is possible to perform processing free from any practical problems, in which those irregularities fall within an acceptable range of processing error, by appropriately setting an interval between the irradiation regions and irradiation conditions of a laser beam such as a pulse width.

(Outline of Laser Processing Apparatus)

Next, description is given of a laser processing apparatus capable of performing processing by various processing patterns described above.

Figure 9:
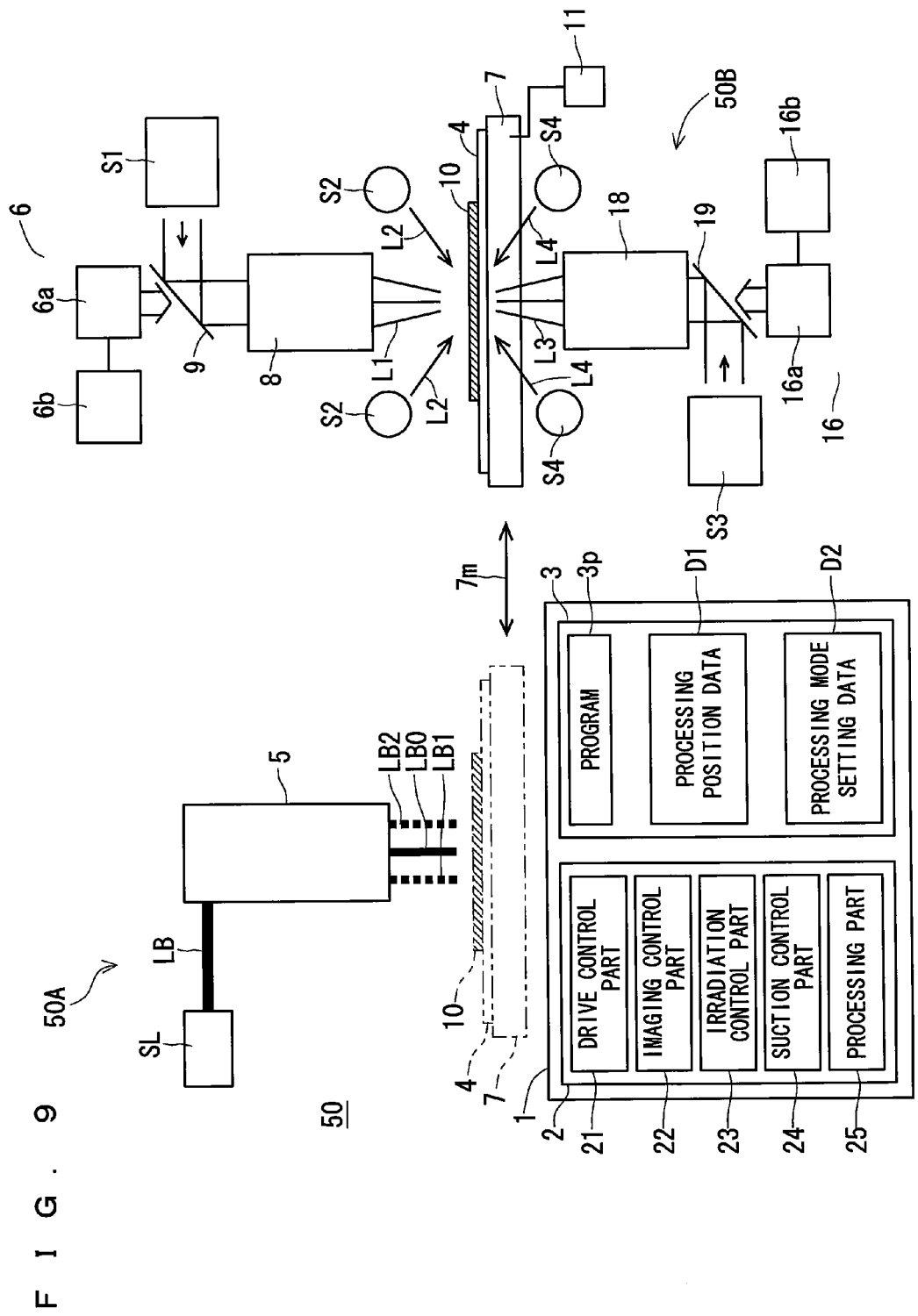
FIG. 9 schematically shows a configuration of a laser processing apparatus according to a preferred embodiment of the present invention.

FIG. 9 schematically shows a configuration of a laser processing apparatus 50 according to the preferred embodiment of the present invention. The laser processing apparatus 50 mainly includes a laser beam irradiation part 50A, an observation part 50B, a stage 7 formed of, for example, transparent material such as quartz on which a workpiece 10 is placed, and a controller 1 that controls various operations (such as observation operation, alignment operation and processing operation) of the laser processing apparatus 50. The laser beam irradiation part 50A includes a laser beam source SL and optical path setting means 5 and is the part where a laser beam is irradiated to the workpiece 10 placed on the stage 7, which is equivalent to the emitting source of a laser beam described above. The observation part 50B is the part where front surface observation in which the side of the workpiece 10 on which a laser beam is irradiated (referred to as a front surface) is directly observed and rear surface observation in which the side of the workpiece 10 which is placed on the stage 7 (referred to as a rear surface) is observed through the stage 7 are performed.

The stage 7 is configured to be movable between the laser beam irradiation part 50A and the observation part 50B in a horizontal direction by a moving mechanism 7m. The moving mechanism 7m moves the stage 7 to predetermined biaxial directions in a horizontal plane by an action of drive means (not shown). This realizes a movement of the laser beam irradiation position in the laser beam irradiation part 50A, a movement of an observation position in the observation part 50B, and a movement of the stage 7 between the laser beam irradiation part 50A and the observation part 50B. Note that the moving mechanism 7m can perform a rotational movement (θ rotation) in a horizontal plane about a predetermined rotation axis, independently of horizontal driving.

Further, the laser processing apparatus 50 can appropriately switch between the front surface observation and the rear surface observation. As a result, it is possible to perform optimum observation according to a material and a state of the workpiece 10 flexibly and quickly.

The stage 7 is formed of transparent material such as quartz and has therein suction piping (not shown) that serves as an intake passage for fixing the workpiece 10 by suction. The suction piping is provided by, for example, drilling a hole at a predetermined position of the stage 7 by mechanical processing.

In the state in which the workpiece 10 is placed on the stage 7, suction of the suction piping is performed by suction means 11 such as a suction pump, and a negative pressure is applied on a suction hole provided at a front end of the suction piping located on the side of the stage 7 on which the workpiece 10 is placed, whereby the workpiece 10 (and transparent sheet 4) is (are) fixed to the stage 7. Note that while FIG. 9 illustrates the case where the workpiece 10 to be processed is bonded to the transparent sheet 4, the transparent sheet 4 is not necessarily required to be bonded.

(Illumination System and Observation System)

The observation part 50B is configured so as to perform the front surface observation by front surface observation means 6 from a side above the stage 7 and the rear surface observation by rear surface observation means 16 from a side below the stage 7 while performing, on the workpiece 10 placed on the stage 7, irradiation of an epi-illumination beam L1 from an epi-illumination beam source S1 and irradiation of oblique transmitted illumination beam L2 from an oblique illumination beam source S2 in a superimposed manner.

Specifically, the epi-illumination beam L1 emitted from the epi-illumination beam source S1 is reflected by a half mirror 9 provided in a lens barrel (not shown) and is irradiated to the workpiece 10. In addition, the observation part 50B includes the front surface observation means 6 that includes a CCD camera 6a provided above the half mirror 9 (above the mirror barrel) and a monitor 6b connected to the CCD camera 6a, and is configured so as to observe a bright field image of the workpiece 10 in real time in the state in which the epi-illumination beam L1 is irradiated.

Further, the observation part 50B includes the rear surface observation means 16 that includes a CCD camera 16a provided below the stage 7, more preferably, below a half mirror 19 (below the mirror barrel) described below and a monitor 16b connected to the CCD camera 16a. Here, the monitor 16b and the monitor 6b included in the front surface observation means 6 may be common to each other.

Further, a coaxial illumination beam L3 emitted from a coaxial illumination beam source S3 provided below the stage 7 may be reflected by the half mirror 19 provided in the mirror barrel (not shown), collected by a light collecting mirror 18, and the irradiated to the workpiece 10 through the stage 7. More preferably, the observation part 50B includes an oblique illumination beam source S4 below the stage 7, and may be configured so as to irradiate an oblique illumination beam L4 to the workpiece 10 through the stage 7. Those coaxial illumination beam source S3 and oblique illumination beam source S4 can be preferably used in observing the workpiece 10 from the rear surface side, such as in a case where an opaque metal layer or the like is provided on the front surface side of the workpiece 10 and the observation from the front surface side is difficult due to the reflection on the metal layer.

(Laser Beam Source)

As the laser beam source SL, one having a wavelength of 500 nm to 1,600 nm is used. Further, in order to perform the processing by the processing patterns described above, a pulse width of a laser beam LB is required to be approximately 1 psec to 50 psec. Further, it is preferred that a repetition frequency R be approximately 10 kHz to 200 kHz and irradiation energy (pulse energy) of a laser beam be approximately $0.1 \mu J$ to $50 \mu J$.

Note that a polarization state of the laser beam LB emitted from the laser beam source SL may be circular polarization or linear polarization. Note that in the case of linear polarization, from the viewpoints of bending of a processing cross section of a crystalline material to be processed and energy absorption rate, it is preferable that a polarization direction and a scanning direction are substantially parallel to each other, for example, an angle made by these directions is within ±1°. In addition, in the case where an emitted light beam has linear polarization, the laser processing apparatus 50 preferably includes an attenuator (not shown). The attenuator is disposed at an appropriate position on an optical path of the laser beam LB and plays a function of adjusting the intensity of the emitted laser beam LB.

(Optical Path Setting Means)

The optical path setting means 5 is the part that sets an optical path of a laser beam when it is irradiated to the workpiece 10. Along the optical path set by the optical path setting means 5, a laser beam is irradiated to a predetermined irradiation position (planned formation position of the irradiation region) of the workpiece.

The optical path setting means 5 is configured, during processing, not only to cause the laser beam LB emitted from the laser beam source SL to be irradiated to the workpiece 10 with its optical path being fixed, but also to actually or virtually set a plurality of optical paths of the laser beam LB when the laser beam LB emitted from the laser beam source SL is irradiated to the workpiece 10 and enable to sequentially switch the optical paths when respective unit pulsed beams of the laser beam LB are irradiated to the workpiece among the set plurality of optical paths. In the latter case, the state in which scanning is simultaneously performed at a plurality of passages on an upper surface of the workpiece 10, or a state virtually regarded as the above-mentioned state is achieved. In other words, it is conceivable that the optical path of the laser beam LB may be multiplied.

While FIG. 9 illustrates a case where scanning is performed at three passages with three laser beams LB0, LB1 and LB2, a mode of multiplying an optical path by the optical path setting means 5 is not necessarily limited thereto. An example of specific configuration of the optical setting means 5 is described below.

(Controller)

The controller 1 further includes a control part 2 that controls operations of the above-mentioned respective parts and realizes the processing of the workpiece 10 in various modes described below, and a storage part 3 that stores a program 3p controlling the operation of the laser processing apparatus 50 and various pieces of data referred to when the processing is performed.

The control part 2 is implemented by general-purpose computers such as a personal computer and a microcomputer, in which various components are implemented as functional components of the control part 2 when the program 3p stored in the storage part 3 is read and executed by the computer.

Specifically, the control part 2 mainly includes: a drive control part 21 that controls operations of various drive parts related to the processing, such as driving of the stage 7 by the moving mechanism 7m and a focusing operation of the light collecting lens 18; an imaging control part 22 that controls imaging by the CCD cameras 6a and 16a; an irradiation control part 23 that controls irradiation of the laser beam LB from the laser beam source SL and setting modes of the optical path in the optical path setting means 5; a suction control part 24 that controls an operation of fixing the workpiece 10 by suction to the stage 7 by the suction means 11; and a processing part 25 that causes the execution of the processing at a processing target position in accordance with the provided processing position data D1 (described below) and processing mode setting data D2 (described below).

The storage part 3 is implemented by storage media such as a ROM, a RAM and a hard disk. The storage part 3 may be implemented by a component of a computer that implements the control part 2 or may be provided separately from the computer such as the hard disk.

The storage part 3 stores the processing position data D1 provided from outside in which the position of the planned processing line set for the workpiece 10 is described. In addition, the storage part 3 stores in advance the processing mode setting data D2 in which, for example, conditions of the respective parameters of the laser beam, setting conditions of the optical path of the optical path setting means 5 and driving conditions of the stage 7 (or allowable setting range of those) are described for each processing mode.

It is preferable that various input instructions given by the operator to the laser processing apparatus 50 are performed with the use of a GUI implemented by the controller 1. For example, a processing menu is provided by the GUI through the function of the processing part 25. The operator selects a processing mode described below and inputs the processing conditions based on the processing menu.

(Alignment Operation)

In the laser processing apparatus 50, prior to the processing, the alignment operation of finely adjusting an arrangement position of the workpiece 10 is executable in the observation part 50B. The alignment operation is a process for making the XY coordinate axes determined with respect to the workpiece 10 coincide with the coordinate axes of the stage 7. The alignment operation is important, in a case where processing is performed in the processing patterns descried above, for satisfying a predetermined relationship required for the crystal orientation of the workpiece, the planned processing line and the scanning direction of a laser beam in the respective processing patterns.

The alignment operation can be executed by employing the well known technology and is only required to be performed in an appropriate mode in accordance with a processing pattern. For example, when a repletion pattern is formed on the surface of the workpiece 10, such as a case where a large number of device chips manufactured using one mother substrate are cut out, appropriate alignment operation is performed with the technique such as pattern matching. Generally speaking, in this case, the CCD camera 6a or 16a captures a plurality of images for alignment marks formed in the workpiece 10, the processing part 25 specifies an alignment amount based on the relative relationship of the imaging positions of those captured images, and the drive control part 21 moves the stage 7 with the moving mechanism 7m in accordance with the alignment amount. Accordingly, alignment is performed.

The processing position in processing is accurately specified by performing the above-mentioned alignment operation. After the completion of the alignment operation, the stage 7 on which the workpiece 10 is placed is moved to the laser beam irradiation part 50A, and then the processing by irradiation of the laser beam LB is performed. Note that in the movement of the stage 7 from the observation part 50B to the laser beam irradiation part 50A, it is ensured that the actual processing position is prevented from sifting from the planned processing position assumed in the alignment operation.

(Outline of Processing)

Next, description is given of the processing in the laser processing apparatus 50 according to this preferred embodiment. In the laser processing apparatus 50, by combining the irradiation of the laser beam LB that has been emitted from the laser beam source SL and passed through the optical path setting means 5 and the movement of the stage 7 on which the workpiece 10 is placed and fixed, the workpiece 10 can be processed while performing scanning of the workpiece 10 in a relative manner with the laser beam that has passed through the optical path setting means 5.

The laser processing apparatus 50 is characterized in that a basic mode and a multi mode are alternatively selectable as the mode (processing mode) of the processing by scanning with the laser beam LB (in a relative manner). Those processing modes are set in accordance with the above-mentioned way of setting of the optical path in the optical path setting means 5.

In the basic mode, the optical path setting means 5 fixedly sets the optical path of the laser beam LB emitted from the laser beam source SL. In the basic mode, the laser beam LB always passes through one optical path and the stage 7 on which the workpiece 10 is placed is moved at a predetermined speed, to thereby perform the processing in the manner in which the workpiece 10 is scanned with the laser beam in one direction.

The basic mode is preferably used in cases where processing is performed by the above-mentioned first and second processing patterns. That is, if the processing is performed in the basic mode to the workpiece 10 in which the planned processing line L is set to be parallel to the easily-cleaved/parted-direction after the alignment of the workpiece 10 is performed such that the easily-cleaved/parted-direction coincides with the moving direction of the stage 7, the processing by the first processing pattern can be performed. On the other hand, if the processing is performed in the basic mode to the workpiece 10 in which the planned processing line L is set to be perpendicular to the easily-cleaved/parted-direction after the alignment of the workpiece 10 is performed such that the easily-cleaved/parted-direction is orthogonal to the moving direction of the stage 7, the processing by the second processing pattern can be performed.

In principle, the basic mode is also applicable to the processing by the third processing pattern by appropriately changing the moving direction of the stage 7.

On the other hand, in the multi mode, the optical path of the laser beam LB is substantially or virtually multiplied and a plurality of optical paths are set. This is the mode in which a plurality of laser beams are used for substantial or virtual scanning along, for example, the straight lines $L\alpha$ and $L\beta$ parallel to the planned processing line L as shown in FIG. 8 and further the planned processing line L itself. This results in similar processing to that of the case where scanning is performed such that the laser beams repeatedly intersect the planned processing line L. Note that virtual scanning with a plurality of laser beams refers to irradiating a laser beam through one optical path similarly to the basic mode in actuality through changing an optical path in time, to thereby realize a manner of scanning where a laser beam is irradiated through a plurality of optical paths.

The multi mode is preferably used in a case of performing processing by the third processing pattern. That is, similarly to the case of the second processing pattern, if processing is performed in the multi mode to the workpiece 10 in which the planned processing line L is set to be perpendicular to the easily-cleaved/parted-direction after alignment of the workpiece 10 is performed such that the easily-cleaved/parted-direction is orthogonal to the moving direction of the stage 7, the processing by the third processing pattern can be performed.

For example, it is preferred that the processing mode be selected in accordance with the processing menu provided in an available manner to the operator in the controller 1 through the function of the processing part 25. The processing part 25 obtains the processing position data D1, obtains the conditions corresponding to the selected processing pattern from the processing mode setting data D2, and controls the operations of the respective corresponding parts through the drive control part 21, the irradiation control part 23 and the like so that the operation corresponding to the conditions is executed.

For example, the wavelength, output, the repetition frequency of a pulse, and a pulse width of the laser beam LB emitted from the laser beam source SL are adjusted by the irradiation control part 23 of the controller 1. When a predetermined set signal corresponding to the processing mode setting data D2 is sent from the processing part 25 to the irradiation control part 23, the irradiation control part 23 sets the irradiation conditions of the laser beam LB in accordance with the set signal.

Particularly in a case where processing is performed in the multi mode, the irradiation control part 23 synchronizes the timing of emitting a unit pulse beam from the laser beam source SL and the timing of switching the optical path by the optical path setting means 5. As a result, a unit pulsed beam is irradiated to the planned formation position of each irradiation region through the optical path corresponding to the planned formation position among a plurality of optical paths set by the optical path setting means.

In the laser processing apparatus 50, it is possible to, in the processing, irradiate the laser beam LB in a defocused state in which a focus point is intentionally shifted from the surface of the workpiece 10 if necessary. For example, this is achieved by adjusting a relative distance between the stage 7 and the optical path setting means 5.

(Configuration Example of Optical Path Setting Means and Operation Thereof)

Next, a specific configuration of the optical path setting means 5 and an example of its operation are described by mainly taking an operation in the multi mode as an example.

In the following description, the processing is performed while moving the stage 7 on which the workpiece 10 is placed along a moving direction D that coincides with the extending direction of the planned processing line L.

In the operation in the multi mode, a laser beam LB0 is irradiated for forming the irradiation regions RE on the planned processing line L, a laser beam LB1 is irradiated for forming the irradiation regions RE on the straight line Lα parallel to the planned processing line L, and a laser beam LB2 is irradiated for forming the irradiation regions RE on the straight line Lβ positioned symmetrically to the straight line Lα with respect to the planned processing line L.

Further, the processing of the third processing pattern in the multi mode is performed by causing a plurality of irradiation regions formed sequentially or simultaneously to be positioned along the easily-cleaved/parted-direction.

Figure 10:
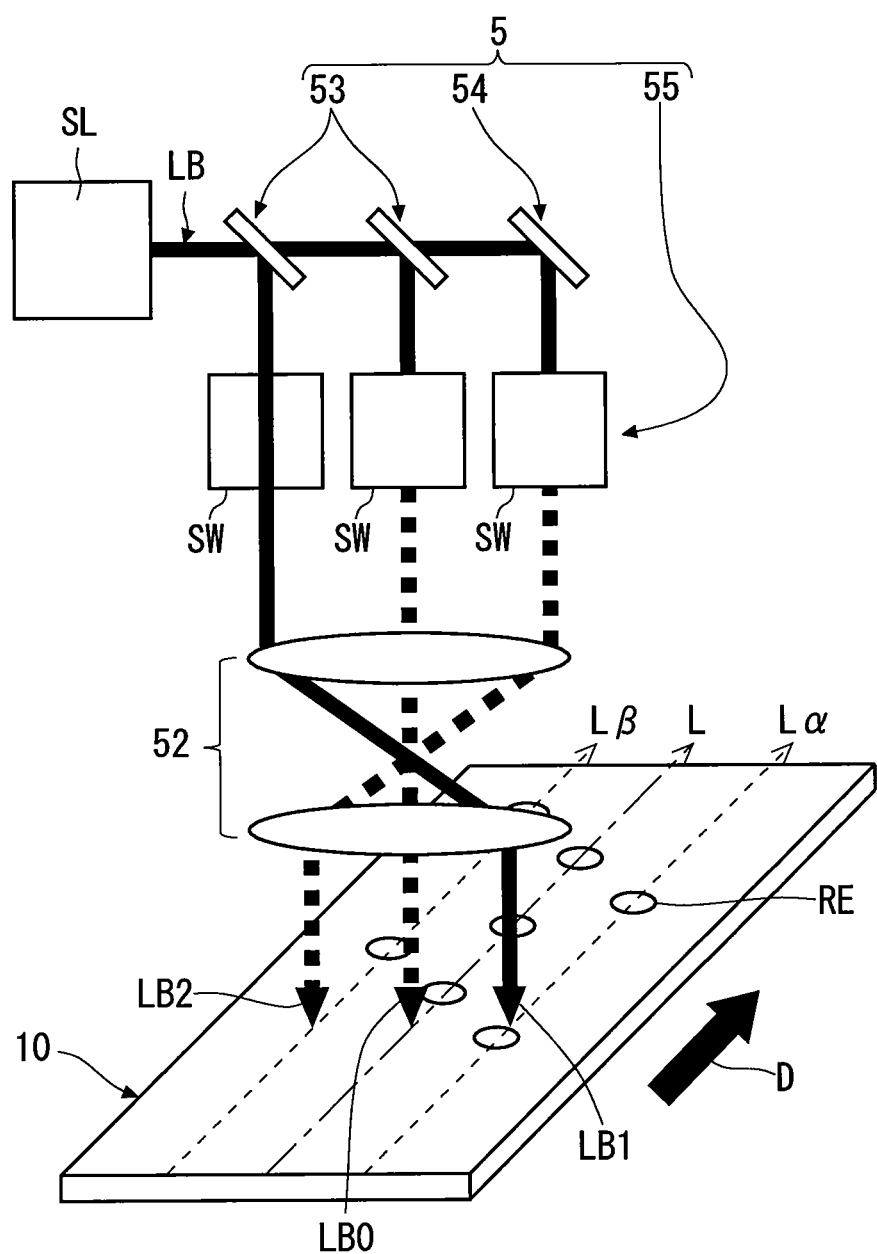
FIG. 10 schematically shows a configuration of optical path setting means.

FIG. 10 schematically shows the configuration of the optical path setting means 5. The optical path setting means 5 includes a plurality of half mirrors 53, a mirror 54, an optical path selecting mechanism 55 and a lens system 52.

The half mirrors 53 and the mirror 54 are provided so as to form a plurality of optical paths (optical paths of the laser beams LB0, LB1 and LB2) by causing an optical path of the laser beam LB emitted from the laser beam source SL to branch in an in-plane direction perpendicular to the moving direction D of the stage 7. Note that the number of half mirrors 53 is set in accordance with the number of optical paths. In FIG. 10, two half mirrors 53 are provided for obtaining three optical paths. The half mirrors 53 and the mirror 54 are provided in this manner, and thus when the stage 7 is moved while emitting the laser beam LB, there is achieved a state in which the workpiece 10 is scanned with a plurality of laser beams.

The optical path selecting mechanism 55 is provided for controlling the timing of emitting laser beams to the workpiece 10 through a plurality of optical paths. More specifically, the optical path selecting mechanism 55 includes optical switches SW in the optical paths for the laser beams that have branched by the half mirrors 53 and the mirror 54. The optical switch SW is constituted of, for example, an acousto-optic modulator (AOM) and an electro-optic modulator (EOM) and has a function of causing an entering laser beam to pass through in an ON state and intercepting or attenuating the entering laser beam (causing the laser beam not to pass through) in an OFF state. Accordingly, only the laser beam that has passed through the switch SW in an ON state is irradiated to the workpiece 10 in the optical path selecting mechanism 55.

The operation in the multimode of the laser processing apparatus 50 including the optical path setting means 5 with the above-mentioned configuration is implemented when the irradiation control part 23 controls ON/OFF operations of the respective optical switches SW such that the optical switches SW on the optical paths of the laser beams LB0, LB1 and LB2 are sequentially and periodically turned on in accordance with the timing for emitting a unit pulsed beam of the laser beam LB following the repetition frequency R. As a result of the above-mentioned control, the laser beams LB0, LB1 and LB2 pass through the optical path selecting mechanism 55 to be irradiated to the workpiece 10 only when the laser beams LB0, LB1 and LB2 reach the timing for forming the irradiation region.

That is, a plurality of optical paths for laser beams irradiated to the workpiece 10 are provided in actuality, and the plurality of laser beams are used for simultaneous scanning in a parallel manner while changing irradiation timing of the respective unit pulsed beams, with the result that the operation in the multi mode is performed.

Note that the operation in the basic mode is enabled by emitting the laser beam LB while always turning on only the optical switch SW on the optical path for any one of the laser beams LB0, LB1 and LB2 and moving the stage 7.

While the invention has been shown and described in detail, the foregoing description is in all aspects illustrative and not restrictive. It is therefore understood that numerous modifications and variations can be devised without departing from the scope of the invention.

What is claimed is:

1. A processing method for forming division originating points in a workpiece, the processing method comprising the steps of:
   a) preparing a workpiece; and
   b) irradiating said workpiece with a pulsed laser beam to discretely form irradiation regions for each of unit pulsed beams of said pulsed laser beam in said workpiece, each of said irradiation regions being an altered region elongated from the surface to the inside of said workpiece,
   wherein in said step b), originating points for division are formed in said workpiece by sequentially generating cleavage or parting of said workpiece between said irradiation regions.

2. The processing method for a workpiece according to claim 1, wherein said cleavage or said parting is generated, by a shock or a stress when one of said each of unit pulsed beams is irradiated to an irradiation position, between said irradiation position for said one of said each of unit pulsed beams and another irradiation position for another one of said each of said unit pulsed beams irradiated immediately therebefore or simultaneously.

3. The processing method according to claim 1, wherein said pulsed laser beam is an ultra-short pulsed beam having a pulse width of psec order.

4. The processing method according to claim 1, wherein at least two of said irradiation regions are formed so as to be adjacent to each other in easily cleaved or parted directions of said workpiece.

5. The processing method according to claim 4, wherein said at least two of said irradiation regions are alternately formed in two of said easily cleaved or parted directions different from each other in said workpiece.

6. The processing method according to claim 4, wherein said irradiation regions are all formed along the easily cleaved or parted directions of said workpiece.

7. The processing method according to claim 1, wherein said irradiation regions are formed in a direction equivalent to two easily cleaved or parted directions different from each other of said workpiece.

8. The processing method according to claim 1, wherein a plurality of said irradiation regions satisfying a relationship of a staggered arrangement are foamed in said workpiece by relatively moving an emitting source of said pulsed laser beam and said workpiece and at the same time, periodically changing an emitting direction of said pulsed laser beam in a plane perpendicular to said relatively moving direction.

9. The processing method according to claim 1, wherein a plurality of said irradiation regions satisfying a relationship of a staggered arrangement are formed in said workpiece by relatively moving a plurality of emitting sources of said pulsed laser beam and said workpiece and at the same time, periodically changing irradiation timings of said unit pulsed beams respectively from said plurality of emitting sources.

10. A method of dividing a workpiece, the method comprising the steps of:
   a) preparing a workpiece;
   b) irradiating said workpiece with a pulsed laser beam to discretely form irradiation regions for each of unit pulsed beams of said pulsed laser beam in said workpiece, each of said irradiation regions being an altered region elongated from the surface to the inside of said workpiece; and
   c) dividing said workpiece, wherein:
   in said step b), originating points for division are formed in said workpiece by sequentially generating cleavage or parting of said workpiece between said irradiation regions; and
   in said step c), said workpiece is divided along the division originating points formed in said step b).

11. A laser processing apparatus, comprising:
   a light source emitting a pulsed laser beam;
   a stage on which a workpiece is placed; and
   an irradiation element irradiating said workpiece with said pulsed laser beam while moving said stage so that irradiation regions for each of unit pulsed beams of said pulsed laser beam are formed discretely in said workpiece placed on said stage, each of said irradiation regions being an altered region elongated from the surface to the inside of said workpiece,
   wherein said irradiation element forms originating points for division in said workpiece by sequentially generating cleavage or parting of said workpiece between said irradiation regions.

12. The laser processing apparatus according to claim 11, wherein said irradiation element generates, by a shock or a stress when one of said each of said unit pulsed beams is irradiated to an irradiation position, said cleavage or said parting between said irradiation position for said one of said each of unit pulsed beams and another irradiation position for another one of said each of said unit pulsed beams irradiated immediately therebefore or simultaneously.

13. The laser processing apparatus according to claim 11, further comprising: an optical path setting element actually or virtually setting a plurality of optical paths of said pulsed laser beam when said workpiece is irradiated with said pulsed laser beam emitted from said light source and sequentially switching an optical path when said each of unit pulsed beams is irradiated to said workpiece is switched among the set plurality of optical paths.

14. The laser processing apparatus according to claim 13, wherein said unit pulsed beam is irradiated to a planned formation position of the irradiation region by said each of unit pulsed beams through an optical path corresponding to said planned formation position among said plurality of optical paths by synchronizing a timing for emitting said unit pulsed beam from said light source and a timing for switching the optical paths set by said optical path setting element.

15. The laser processing apparatus according to claim 13, wherein said optical path setting element sets said plurality of optical paths by causing the optical path of said pulsed laser beam emitted from said light source to branch into a plurality of optical paths, and sequentially switches an optical path when said each of unit pulsed beams of said pulsed laser beam is irradiated to said workpiece among said plurality of optical paths.

16. The laser processing apparatus according to claim 15, wherein said optical path setting element sequentially switches an optical path when said each of unit pulsed beams of said pulsed laser beam is irradiated to said workpiece among said plurality of optical paths, by causing said pulsed laser beam that has reached a timing for forming the irradiation region to be emitted to said workpiece and intercepting or attenuating said pulsed laser beams that have not reached said timing.

17. The laser processing apparatus according to claim 16, wherein said optical path setting element comprises an optical path selecting mechanism setting, for each of said pulsed laser beams passing through said plurality of optical paths, a passing state in which said pulsed laser beam is irradiated to said workpiece and a non-passing state in which said pulsed laser beam is intercepted or attenuated,
   said optical path selecting mechanism setting only said pulsed laser beam that has reached the timing for forming the irradiation region in said workpiece to the passing state to cause the pulsed laser beam to be emitted to said workpiece, and setting said pulsed laser beams that have yet to reach said timing thereamong to the non-passing state.

* * * * *